Figure 1:
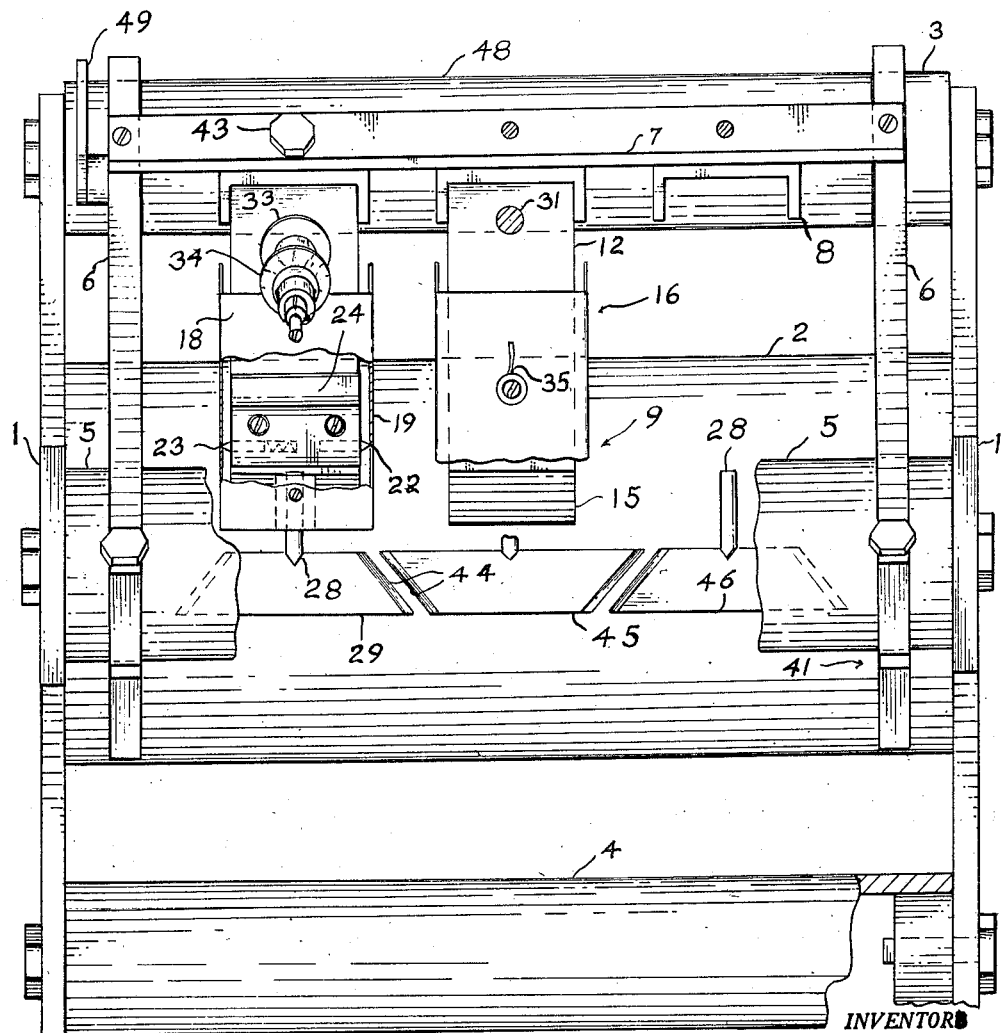

July 9, 1957　　H. C. LINDEMANN ET AL　　2,798,912
SLUB DETECTING AND LOCATING APPARATUS
Filed Aug. 16, 1954　　2 Sheets-Sheet 1

INVENTORS
HOWARD C. LINDEMANN
DANIEL MINDHEIM
BY Nicholas J. Garofalo
ATTORNEY

United States Patent Office 2,798,912
Patented July 9, 1957

2,798,912

SLUB DETECTING AND LOCATING APPARATUS

Howard C. Lindemann, Westbury, and Daniel Mindheim, Glen Oaks, N. Y.

Application August 16, 1954, Serial No. 450,032

9 Claims. (Cl. 200—61.14)

This invention relates to cloth inspecting devices. It is particularly concerned with a device of this nature for detecting and locating defects, such as slubs, in cloth. Slubs are raised defects in the cloth and may be a few thousandths of an inch or more in thickness. Presently, for want of a more practical and efficient method in detecting and locating defects of this kind in cloth, the cloth is inspected visually and the defect, when located, is manually marked off for subsequent repair. This visual inspection is slow, costly, and subject to the frailties of the operator.

Now, we have invented a practical and efficient means the general object of which is to detect and locate defects in cloth in a quick and practical manner with a minimum of labor and expense. It is simple in structure and inexpensive to manufacture, and, when employed, it is fast and thorough in operation.

The invention utilizes a simple structure through which cloth, drawn from a bolt, machine, or in other suitable manner, may be passed and defects in the cloth detected. The defects are detected by a plurality of novel feelers that sense the cloth as the latter passes beneath. Through a system of signals associated with the feelers, the operator is notified when a defect is detected and is apprized as to its location.

A feature of the invention lies in its simple yet practical nature, as well as in the economy of its manufacture whereby it becomes within the reach of all.

A further feature of this invention lies in the novel structure of the feeler elements, as well as in their particular arrangement, whereby no slub in the cloth will escape detection.

Another feature of the invention lies in the adjustability of the feeler elements to detect, as desired, slubs of various thicknesses.

A still further feature of the invention is found in the signal system whereby the operator is instantly warned of the detection of a slub and the particular location thereof, so that the operator may stop the machine and visually examine the nature of the defect, or mark it off for subsequent repair.

A further object of the invention is, therefore, to provide means for detecting slubs of various thicknesses in cloth, and in such a manner that no slub will escape detection.

A still further object of the invention is to provide mechanisms that will detect slubs in cloth and will signal to the operator the location thereof.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

Figure 2:
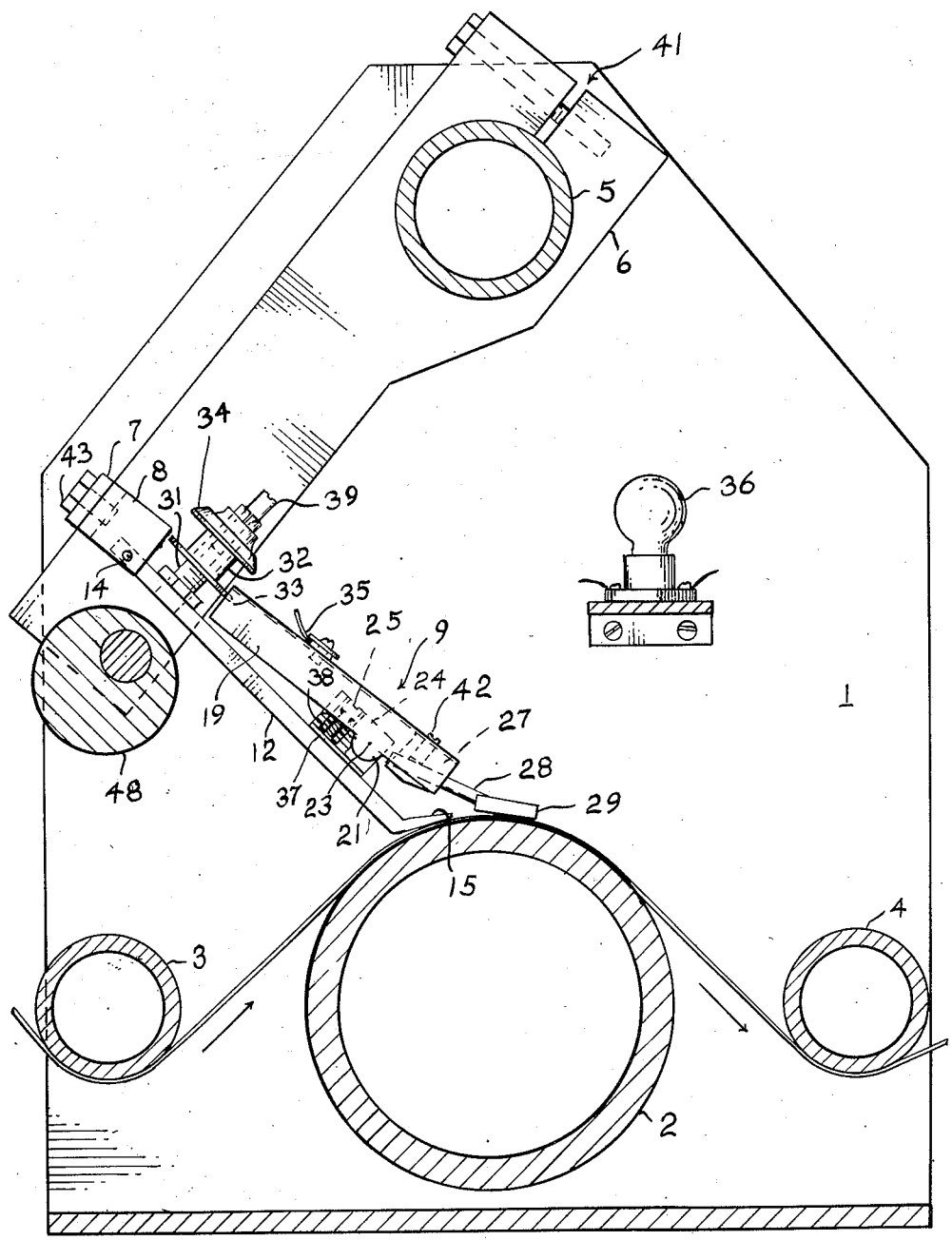

In the drawings:

Fig. 1 is a top plan of slub detecting apparatus embodying the invention with some parts cut away for a better illustration; and Fig. 2 is a cross section thereof.

In describing the invention in further detail, reference is directed to the drawings, wherein there is shown in a slub detecting apparatus a pair of opposed vertical frame or support members 1 supporting in horiozntal position between them an elongated main cylinder 2 of substantial diameter and a pair of cylinders 3 and 4 relatively smaller in diameter. The latter are positioned at opposite sides of the main cylinder and in spaced relation thereto. A cross shaft 5, supported at its ends by the frame members 1 near the top of the latter, supports a pair of depending arms 6 disposed angularly rearward. A cross bar 7 fixed at its ends to the rear sides of arms 6 supports a plurality of C brackets or yokes 8 along its inner face. Pivotally mounted in each bracket 8 is a slub detecting unit 9, the detecting portion of which is arranged to rest upon the main cylinder 2.

Cylinders 2, 3 and 4 have highly polished surfaces to allow a wide strip of cloth drawn from a bolt or other proper source, not shown, to pass over the cylinders with a minimum of resistance. The cloth is drawn from the bolt, processing machine, or other source, as the case may be. It is then brought angularly down to the underside of cylinder 3, over the top surface of cylinder 2 beneath the slub sensing units 9, and then is carried down to the underside of cylinder 4 from where it is led angularly up to rewinding or other mechanism adapted to draw the cloth through the inspection apparatus. By this arrangement the cloth is drawn taut, presenting a flat and smooth surface over the upper surface of the main cylinder 2 for detection of defects by the sensing members. Such defects in the cloth are called slubs, which term includes a variety of defects, such as seams, knotted, twisted or bunched strands, and the like.

A slub detecting unit 9 comprises sensing or feeler means and mechanism operable by the latter upon detection of a slub to close a switch in a signal circuit to indicate to the operator of the device the presence and location of a defect in the cloth. A member 9 includes an elongated rectangular bar 12 which is pivotally carried at one end between the arms of a bracket 8 by a cross pin 14. The forward or free end of bar 12 provides an upwardly turned foot 15, the underside of which rests tangently upon the main cylinder 2, and when cloth is drawn over the main cylinder, it is adapted to rest upon the cloth. Bar 12 serves as a support for a slub sensing or feeler member 16 superimposed above it. Member 16 is in the form of a channel bar and includes an elongated rectangular body plate 18 provided with a depending pair of side walls 19 forming a channel beneath the plate 18. Side walls 19 carry near the forward ends thereof a pair of depending opposed ears 21, each of which is provided with a fine hole engaging a pointed end of a pair of pins 22, 23 projecting laterally from opposite sides of a block 24. The latter is secured by bolts 25 to the upper surface of bar 12. Pin 22 is fixed; pin 23 is slidable in the block and is cushioned by a spring 26, whereby pin 23 may be pressed inwardly against the bias of the spring to facilitate assembly or removal of feeler member 16 from the pins.

Depending from the underside of the forward end of plate 18 of member 16 is a lug or boss 27 which supports an elongated forwardly extending rod 28. The latter is integral with a sensing or feeler shoe 29 positioned transversely of the free end of the rod.

Shoe 29 is elongated and provides a smooth undersurface which is intended to rest upon the main cylinder, tangently in parallel relation thereto and at a point a little further up on the cylinder than the position of the foot member 15. This higher location of the shoe member relative to the foot is enabled by the ears 21 of member 16 and by the height of block 24.

The elements 12 and 16 of the detecting unit are disposed at a slight angle toward the vertical axis of cylinder 2, and member 16 is so pivoted on the block 24 on element 12 that the center of gravity is in the shoe end thereof whereby the latter is normally pivoted into contact with cylinder 2 or the cloth upon the cylinder.

In the operation of the device, as a length of cloth sheeting is drawn over the surface of main cylinder 2, it passes first beneath the foot element 15, and subsequently beneath the sensing shoe 29. Now, should there be a raised defect in the cloth it will, in passing beneath the shoe element, cause it to tilt anti-clockwise to the extent of the thickness of the slub. This action serves to close suitable switch means about to be described, to a signal device indicating the presence and location of a defect in the cloth.

The switch means comprises an electrical conducting stud or screw contact member 31 projecting out from the top surface of support bar 12. Threaded onto the body of member 31 is a contact nut 32 having a pair of spaced peripheral flanges 33, 34. The rearward edge of plate 18 of member 16 projects between the flanges, overhanging flange 33; the body of nut 32 is arranged on bar 12 so as to be also free of conductive plate 18. Plate 18 is connected by a terminal in an electrical line 35. Block 24 on which plate 16 is pivoted is insulated from conductive bar 12 by a sheet of electrical insulating material 37 and by insulator bushings 38 about the block fastening bolts 25. It is clear, that when plate 18 is caused to be tilted by a slub passing beneath the shoe 29 thereof, the edge of plate 18 will contact flange 33 and close a circuit through bar 12 and the conductive framework to light a signal lamp 36 supported in the framework.

It is clear, that by adjusting the position of the flange nut 32 on the body of screw member 31, the flange contact 33 may be carried nearer or farther away from the overhanging contact plate 18. By this arrangement it is evident that the device may be adjusted for detecting slubs of various thicknesses. In a close adjustment of the contact elements, a slub of a few thousandths in thickness will be sufficient to effect a closing of the contacts, while in wider adjustments slubs of greater thickness are required to effect a closing of the contacts. Suitable markings may be indicated on the upper flange 34 as a guide in the adjustment of flange 33 relative to plate 18.

The adjusted position of nut 32 may be set by a screw 39 threadable in the split free end of screw 31. The set screw 39 tapers out or enlarges towards its upper end, so that as the tapered end enters screw 31, it causes the split portions of the latter to expand and lock or set the position of the flange nut 32 thereon.

It is desired that foot 15 of the support member 12 rest upon the cylinder backed cloth at all times, and preferably, lengthwise of the center of the foot. This foot is about a half inch in width and, when positioned as above, provides a slight space between the heel thereof and the cloth. This serves as a guide to slubs moving under the foot. To insure this positioning of the foot as above at all times, the depending arms 6 are adjustable on cross shaft 5 by means of releasable locking means 41 at the end of the arms. By this arrangement, the arms 6 may be swung further away or in toward the cylinder to bring about a proper relation of the foot to the cylinder and the cloth on the latter.

However, in making adjustments for the foot member, it is clear that the shoe member 29 might likewise have to be moved further in or out with respect to the cylinder 2, so that it also may position its forward edge portion at all times on the cloth backed cylinder and may retain a slight space at the heel thereof to allow for movement of a slub thereunder. To adjust the shoe position relative to the cylinder, the projecting portion of rod 28 of the shoe may be lengthened or shortened by moving it in or out of the boss element 27. Its position may be set by tightening the set screw 42.

The shoe member 29 is elongated so that it may rest upon a reasonable length of the cylinder; and we find a suitable length to be about two inches. The adjustable rod 28 and set screw element 42 permit the shoe to be arranged upon the cylinder without any one end of the shoe being angularly raised from the cylinder.

To provide for repairs on replacement of a detecting unit 9, the latter is removable; and to this end the bracket 8 supporting the unit is secured to the cross bar 7 by removable bolt means 43.

Each slub detecting unit 9 is intended to sense a particular portion of the cloth that moves over the main cylinder 2, and to this end the units are arranged side by side by means of the supporting brackets 8.

Further, each unit is associated with its own identifying signal lamp 36, such as a particularly colored lamp, one of the lamps being shown in Fig. 2. By this arrangement when a slub is passed over the cylinder, it will pass under and actuate a particular detecting unit, which in turn will light up a particular lamp. This will identify to the operator the area of the cloth containing the slub.

The limited length of the feeler shoe, which is desirably about two inches makes it easier for the operator to locate the defect for marking purposes and subsequent repair. It is understandable that a limited space will separate one shoe from the next so as to allow free movement of a shoe when actuated without interfering with or contacting neighboring shoes. This limited space is, however, apt to allow fine slubs to escape. To make certain that no slub will escape detection in this manner, each alternate shoe is formed with angularly disposed side edges 44 that are complementary to the side edges of neighboring shoes. For example, in Fig. 1 the side edges 44 of the shoe designated 45 extend angularly outward while the complementary sides of neighboring shoes 46 and 29 extend angularly inward. By this arrangement a limited space angularly separates one shoe from the next, allowing free movement of each, and the longer edge of each alternate shoe is partially forward of the longer edge of each neighboring shoe whereby no slubs can escape between them without being detected by one shoe or the other, or both.

It is clear, while but three detecting units 9 are shown in the drawings, the apparatus may be constructed to contain any desirable number of units; and where the number of units are many, the bracket cross bar 7, if necessary, may be supported by additional arms 6.

A further feature of the apparatus is provided by an elongated cross cam shaft 48 supported at its ends in the depending arms 6. This shaft underlies the several foot bars 12 of the sensing units 9. It is provided with suitable means, such as a crank lever 49, whereby the cam shaft may be turned until the high point thereof contacts and simultaneously lifts the several sensing units free of the main cylinder 2. This feature avoids the necessity of individually raising each sensing unit in assembling the cloth over the main cylinder at the start of operations.

Although but one embodiment of the invention has been illustrated and described in detail, it is to be expressly understood that the invention is not limited thereto; and it is our intent, therefore, to claim the invention not only as shown and described, but also in all such forms and modifications thereof as may be reasonably construed to be within the spirit of the invention and the scope of the appended claims.

We claim:

1. In a slub sensing unit of the character described having a frame support, a cross bar carried in the latter, and a cylinder supported in spaced parallel relation to the cross bar and at a lower level; a first leg member pivoted at one end in a bracket mounted on the cross bar and having a foot piece at the other end continuously resting upon the surface of the cylinder, a block mounted on the upper surface of the first leg member, a second leg member pivoted near one end on the block in spaced relation above the first leg member, the second leg tending to pivot its opposite end downwardly toward the cylinder, a shoe element carried at the end of a shaft projecting axially from the said opposite end of the second leg member, the shoe continuously resting upon the cylinder at a point further up thereon than the foot piece, normally open electrical contact means formed in part by the first leg member and in part by the second leg member, the first leg member adapted to pivot upwards and to carry the second leg with it in response to a raised defection in a web of cloth passing over the cylinder beneath the foot piece, and the shoe element being actuable to pivot the second leg member upwards in response to the said raised defection next passing under the shoe element.

2. In apparatus of the character described, including a supporting framework, a cylinder crosswise of the framework over which sheet material including raised defects is adapted to be drawn, and a crossbar disposed in spaced parallel relation to the cylinder and on a plane slightly above the latter; the combination of an electrical conductive bar pivoted at one end upon the cross bar and resting at the other end upon the sheet material above the surface of the cylinder, an electrical contact stud projecting upwardly from the surface of the conductive bar, an insulated block member mounted to the surface of the conductive bar, an electrical contact arm pivoted near one end to the insulated block member in superimposed spaced relation to the conductive bar, a rod projecting from one end of the contact arm and having a bar shoe transversely of the end thereof, the bar shoe normally resting upon the sheet material above the surface of the cylinder, in parallel relation to the cylinder and at a point further up on the cylinder than the resting end of the conductive bar; the opposite end of the contact arm having a position normally spaced slightly above the stud contact; and the contact arm being pivotable to close upon the stud contact upon a raised defect in the sheet material passing under the bar shoe.

3. In the combination as set forth in claim 2, wherein means is provided for adjusting the angular position of the bar shoe and the resting end of the conductive member relative to the cylinder.

4. In the combination as set forth in claim 2, wherein the rod projecting from the contact arm is adjustably mounted therein for adjusting the position of the bar shoe angularly relative to the cylinder.

5. In the combination as in claim 2, wherein the stud contact is characterized by a nut threaded thereon and adjustable relative to the end of the contact arm to vary the gap between the stud contact and the latter.

6. In a device of he character described for sensing raised defects in sheet material drawn over a supporting cylinder, the combination of a cross bar disposed in parallel spaced relation to the cylinder, a plurality of sensing units supported in close side by side arrangement along the cross bar, each sensing unit including an extended foot bar pivoted at one end upon the cross bar and resting at the other end upon the material above the cylinder, and a feeler bar pivotally supported upon the foot bar at one end and having a laterally extending feeler shoe at the other end resting on the material at a point further up on the cylinder and in parallel relation to the latter, wherein the feeler shoe of every other sensing unit is characterized by diverging side ends, and the feeler shoe of each alternate sensing unit is characterized by complementary converging side ends disposed in close proximity to the side ends of the adjacent shoes.

7. Slub detecting mechanism of the character described including a framework and a highly polished cylinder over which cloth may be drawn flat and smooth to enable sensing of slub defects in the cloth, a plurality of sensing units arranged laterally one next to the other relative to the cylinder, each sensing unit comprising a bracket supported in the framework, a pair of switch contacts, one contact being supported by the bracket, the other contact being pivotedly mounted upon the first mentioned contact and insulated therefrom, an edge of one contact overhanging a conductive stud of the other, a shoe extending from the pivoted contact and adapted to rest upon the cloth as the latter is drawn over the cylinder, the pivoted contact being pivotable, upon a slub in the cloth passing under and raising the shoe, to close upon the conductive stud and establish a circuit; wherein the shoes of the plurality of sensing units are laterally elongated and the edges of the sides of each alternate shoe is disposed angularly inward and complementary to the sides of each adjacent shoe and in close proximity thereto.

8. A sensing switch for sensing slubs in a web of cloth moving over a cylinder and closing an electrical circuit upon sensing a slub, the sensing switch comprising a conductive bar pivoted at one end in a support having a higher level than and being in spaced relation to the cylinder, the bar having a foot at its opposite end continuously resting upon the cloth above the cylinder, the bar including a conductive stud projecting from its upper surface carrying a nut contact threaded thereon, an insulated block fixed upon the said surface of the bar, an elongated conductive member pivoted on the block intermediately of its ends and including a feeler member at one end, the elongated member having a tendency to pivot in a downward direction so that the feeler member continuously rests upon the cloth above the cylinder, the opposite end of the elongated member closely overhanging the nut contact, and the elongated member being adapted to pivot upward so as to close its overhanging end upon the nut contact as a slub of predetermined thickness passes under the feeler member.

9. A sensing switch as in claim 8, wherein the nut contact is adjustable upon the stud so as to vary its proximity to the overhanging end of the elongated member, whereby the thickness of the slubs in the cloth required to effect closing of the said overhanging end upon the nut contact may be predetermined.

References Cited in the file of this patent

UNITED STATES PATENTS

| | | |
|---|---|---|
| 1,071,608 | Dear et al. | Aug. 26, 1913 |
| 1,378,887 | Martin | May 24, 1921 |
| 2,089,936 | Ahlburg | Aug. 17, 1937 |
| 2,091,522 | Perry | Aug. 31, 1937 |
| 2,179,517 | Pelosi | Nov. 14, 1939 |
| 2,636,951 | Fahringer | Apr. 28, 1953 |